United States Patent
Kunieda (10) Patent No.: US 8,559,759 B2
(45) Date of Patent: Oct. 15, 2013

(54) IMAGE PROCESSING APPARATUS FOR IMAGE REDUCTION PROCESSING AND CONTROL METHOD THEREOF

(75) Inventor: Shutaro Kunieda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 111 days.

(21) Appl. No.: 13/242,890

(22) Filed: Sep. 23, 2011

(65) Prior Publication Data

US 2012/0082400 A1 Apr. 5, 2012

(30) Foreign Application Priority Data

Sep. 30, 2010 (JP) .................................. 2010-222431

(51) Int. Cl.
*G06K 9/32* (2006.01)
(52) U.S. Cl.
USPC ......................................... 382/298; 382/300
(58) Field of Classification Search
USPC ......................................... 382/298, 300, 275
See application file for complete search history.

(56) References Cited

U.S. PATENT DOCUMENTS

| 6,417,889 | B1 * | 7/2002 | Numata | 348/581 |
| 7,613,349 | B2 * | 11/2009 | Ogasawara et al. | 382/233 |
| 8,064,636 | B2 * | 11/2011 | Yokoi et al. | 382/100 |
| 8,264,740 | B2 * | 9/2012 | Ishii et al. | 358/1.2 |
| 2010/0158410 | A1 * | 6/2010 | Kusakabe | 382/284 |

FOREIGN PATENT DOCUMENTS

| JP | 2001-036812 | 2/2001 |
| JP | 2007-067917 | 3/2007 |

* cited by examiner

*Primary Examiner* — Yon Couso
(74) *Attorney, Agent, or Firm* — Cowan, Liebowitz & Latman, P.C.

(57) ABSTRACT

The present invention has a configuration in which a reduction and interpolation circuit having a variable reduction ratio and at least one reduction circuit having a fixed reduction ratio are sequentially connected. In the case where a set reduction rate cannot be achieved in the reduction and interpolation circuit, a reduction ratio for the reduction and interpolation circuit is determined such that the set reduction ratio can be achieved through a combination of the reduction ratio of the reduction and interpolation circuit and the reduction ratio of the reduction circuit. It is thereby possible to obtain an image processing apparatus capable of generating a reduced image reduced at a high reduction ratio and having high image quality while suppressing the circuit size.

6 Claims, 5 Drawing Sheets

IMAGE PROCESSING APPARATUS FOR IMAGE REDUCTION PROCESSING AND CONTROL METHOD THEREOF

BACKGROUND OF THE INVENTION

1. Field of the Invention

The present invention relates to an image processing apparatus for image reduction processing and a control method thereof.

2. Description of the Related Art

The number of pixels in image sensors such as CCD image sensors and CMOS image sensors incorporated in capturing apparatuses such as digital cameras is increasing, and image sensors having more than ten megapixels are not rare any more. An increase in the number of pixels leads to an increased amount of image data, and therefore there are cases where an image (original image) captured at the maximum number of pixels is subjected to image reduction processing according to the application of the image.

Generally, image reduction is implemented by pixel thinning or interpolation, and in order to suppress a situation in which high frequency components appear as aliasing noise due to the pixel thinning or interpolation, preprocessing is performed to remove the high frequency components from the original image using a band-limiting filter (low-pass filter).

Generally, if a low-pass filter that can limit the original image to a lower frequency band can be used, a reduced image reduced at a higher reduction ratio and having high image quality can be obtained while suppressing the influence of aliasing noise.

Japanese Patent Laid-Open No. 2001-036812 discloses a configuration that implements a low-pass filter using two line memories. However, in order to obtain an image having high image quality and a high reduction ratio (for example, a vertical reduction ratio of 1/5 or 1/10), a prefilter having a large number of taps is required.

In addition, Japanese Patent Laid-Open No. 2007-067917 discloses a configuration that suppresses the size of image processing circuitry and the image processing load by converting input image data to intermediate image data. However, conversion of input image data to intermediate image data each time an image having a different reduction ratio is generated requires a large number of memory reading and writing operations.

In order to implement a low-pass filter for limiting an image to a low frequency band, a large number of line memories are required, which results in not only an increase in circuitry size but also an increase in cost.

On the other hand, in the case where a low-pass filter circuit having a reduced number of line memories and a reduced circuitry size and cost is used for image reduction processing, a problem arises in that band limitation (or in other words, suppression of aliasing noise) will be insufficient if the reduction ratio is high, resulting in a reduced image having reduced image quality.

SUMMARY OF THE INVENTION

The present invention has been conceived in view of the problems encountered with conventional technology as described above, and the present invention provides an image processing apparatus capable of generating a reduced image reduced at a high reduction ratio and having high image quality while suppressing the circuitry size, and a control method thereof.

According to one aspect of the present invention, there is provided an image processing apparatus that reduces an original image and generates a reduced image having a set reduction ratio, the apparatus comprising: a first reduction unit adapted to apply reduction processing to the original image using a variable reduction ratio and outputs a first reduced image; and a second reduction unit adapted to apply reduction processing using a fixed reduction ratio to the first reduced image and output a second reduced image, wherein in a case where the set reduction ratio is higher than a highest value of the variable reduction ratio, the first reduction unit sets the variable reduction ratio such that the set reduction ratio can be achieved through a combination of the reduction processing by the first reduction unit and the reduction processing using the fixed reduction ratio, and the second reduction unit outputs a reduced image having the set reduction ratio.

According to another aspect of the present invention, there is provided a control method of an image processing apparatus that reduces an original image and generates a reduced image having a set reduction ratio, the method comprising: a first reduction step of applying reduction processing using a variable reduction ratio to the original image and outputs a first reduced image; and a second reduction step of applying reduction processing using a fixed reduction ratio to the first reduced image and outputting a second reduced image, wherein in a case where the set reduction ratio is higher than a highest value of the variable reduction ratio, the first reduction step sets the variable reduction ratio such that the set reduction ratio can be achieved through a combination of the reduction processing applied in the first reduction step and the reduction processing using the fixed reduction ratio, and the second reduction step outputs a reduced image having the set reduction ratio.

Further features of the present invention will become apparent from the following description of exemplary embodiments with reference to the attached drawings.

DESCRIPTION OF THE EMBODIMENTS

Exemplary embodiments of the present invention will now be described in detail in accordance with the accompanying drawings.

Figure 1:
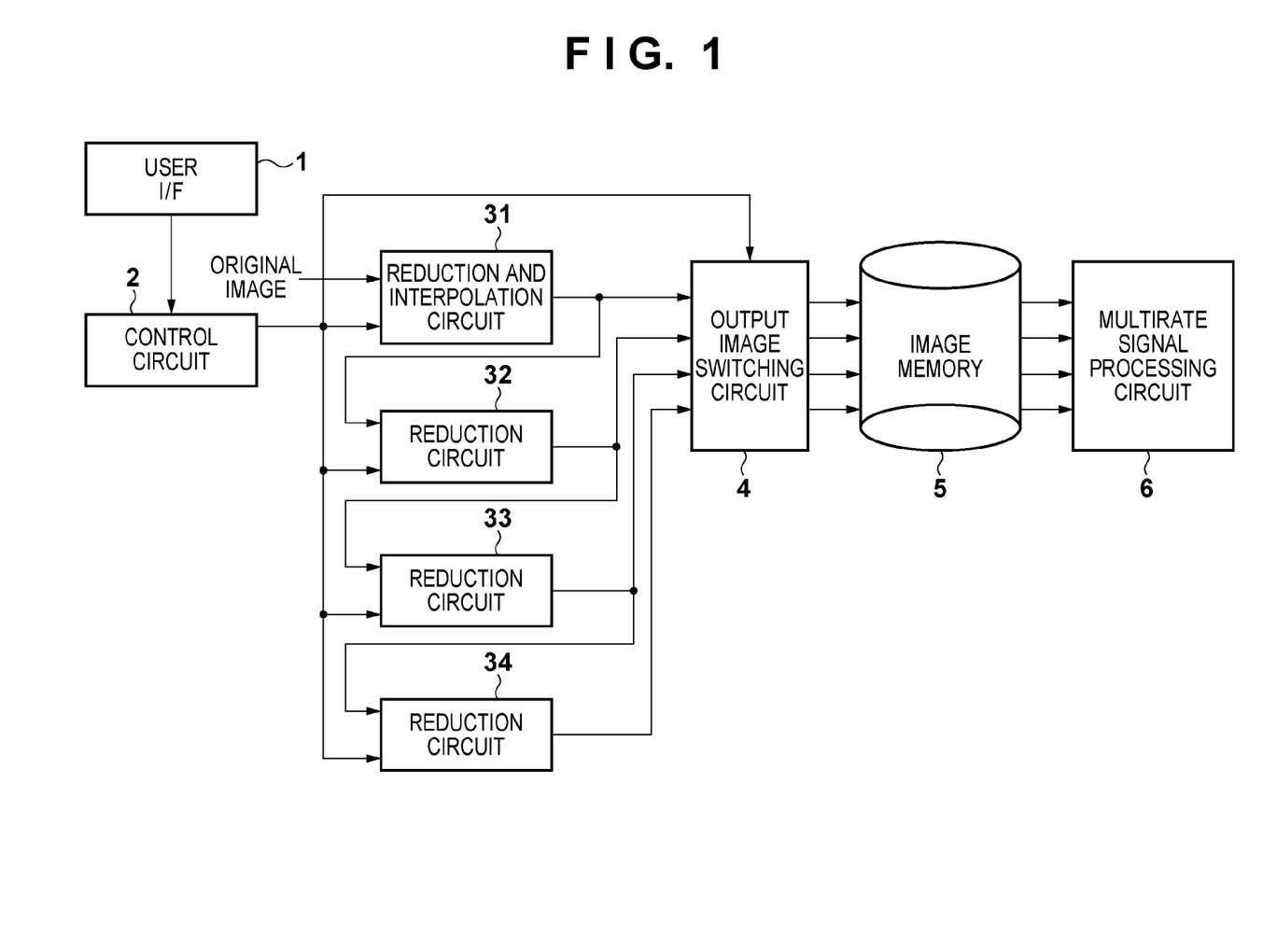
FIG. 1 is a block diagram showing an example of a configuration of an image processing apparatus according to an embodiment of the present invention.

FIG. 1 is a block diagram showing an example of a configuration of an image processing apparatus according to an embodiment of the present invention. The present embodiment will be described using an example configuration in which the maximum number of stages of reduced images band-separated for multirate signal processing is set to 4. but there may be more than or less than four stages.

A user interface (I/F) 1 of the image processing apparatus receives various types of operation commands and parameters (image reduction ratio X, switching between moving image mode and still image mode, and so on) input by a user and outputs the received commands and parameters to a control circuit 2. As used herein, the term "large reduction ratio" or "high reduction ratio" means that the absolute value of the reduction ratio is small (images are reduced to a smaller size). The term "small reduction ratio" or "low reduction ratio" means that the absolute value of the reduction ratio is large (images are not reduced very much).

The control circuit 2 generates control signals in response to information input through the user I/F 1 such as operation commands and parameters, and outputs the information to a reduction and interpolation circuit 31, a reduction circuit 32, a reduction circuit 33 and a reduction circuit 34.

The reduction and interpolation circuit 31 is a reduction circuit having a variable reduction ratio. The reduction and interpolation circuit 31 applies, to original image data obtained from a capturing unit (not shown), reduction processing using a reduction ratio determined according to the reduction ratio input through the control circuit 2, and generates a first reduced image. The reduction and interpolation circuit 31 includes a linear filter that implements frequency band limitation characteristics according to the set reduction ratio, a thinning circuit that thins out the pixels in the horizontal direction, a thinning circuit that thins out the pixels in the vertical direction, and so on. The configuration and operations of the reduction and interpolation circuit 31 will be described later in detail. The reduction and interpolation circuit 31 outputs the first reduced image to an output image switching circuit 4 and the reduction circuit 32 as a first stage image. The original image data may be supplied from a storage device or external apparatus, instead of the capturing unit.

The reduction circuit 32 removes the high frequency components of the first stage image using a fixed filter that halves the band, for example, a low-pass filter such as [1 2 1]/4. As used herein, "low-pass filter" is a spatial filter, and if a spatial filter [1 2 1]/4 is applied to p2 of pixel columns p1, p2 and p3, an applied value p2' can be obtained by the following calculation:

$$p2'=(1 \times p1+2 \times p2+1 \times p3)/4.$$

Accordingly, the reduction circuit 32 performs such calculation on each pixel included in the first stage image, and generates an image whose frequency band is limited to half. In the following description, the spatial filter is applied in the same manner.

In response to a control signal input from the control circuit 2, the reduction circuit 32 thins out the pixels of the image whose band has been limited to half to 1/2 in both horizontal and vertical directions, and generates a second reduced image. The reduction circuit 32 outputs the second reduced image to the output image switching circuit 4 and the reduction circuit 33 as a second stage image.

The reduction circuit 33 removes the high frequency components of the second stage image using a fixed filter that halves the band, for example, a low-pass filter such as [1 2 1]/4. In response to a control signal input from the control circuit 2, the reduction circuit 33 thins out the pixels of the image whose band has been limited to half to 1/2 in both horizontal and vertical directions, and generates a third reduced image. The number of pixels of the third reduced image is equal to the number of pixels obtained by thinning out the pixels of the first reduced image to 1/4 in both horizontal and vertical directions. The reduction circuit 33 outputs the third reduced image to the output image switching circuit 4 and the reduction circuit 34 as a third stage image.

The reduction circuit 34 removes the high frequency components of the third stage image using a fixed filter that halves the band, for example, a low-pass filter such as [1 2 1]/4. The reduction circuit 34 thins out the pixels of the image whose band has been limited to half to 1/2 in both horizontal and vertical directions in accordance with a control signal input from the control circuit 2, and generates a fourth reduced image. The number of pixels of the fourth reduced image is equal to the number of pixels obtained by thinning out the pixels of the first reduced image to 1/8 both horizontal and vertical directions. The reduction circuit 34 outputs the fourth reduced image to the output image switching circuit 4 as a fourth stage image.

The output image switching circuit 4 selects one or more of the first to fourth stage images according to the reduction ratio from the control circuit 2, and stores the selected multistage images in an image memory 5, which is a storage device, for use in combining processing performed by a multirate signal processing circuit 6.

The multirate signal processing circuit 6 combines the multistage images stored in the image memory 5, and generates the final reduced image. To describe it specifically, among the multistage images stored in the image memory 5, a stage image having a high reduction ratio has a high SN ratio, but the perceived resolution is low. In contrast, a stage image having a low reduction ratio has a high perceived resolution, but the SN ratio is low. Accordingly, by utilizing their respective characteristics, a reduced image having better image quality can be generated by combining regions of the same color in a stage image having a low reduction ratio with a stage image having a high reduction ratio. Such an image combining operation performed by the multirate signal processing circuit 6 is well known in the art and is not directly relevant to the present invention, and thus a detailed description thereof is omitted here.

Figure 2:
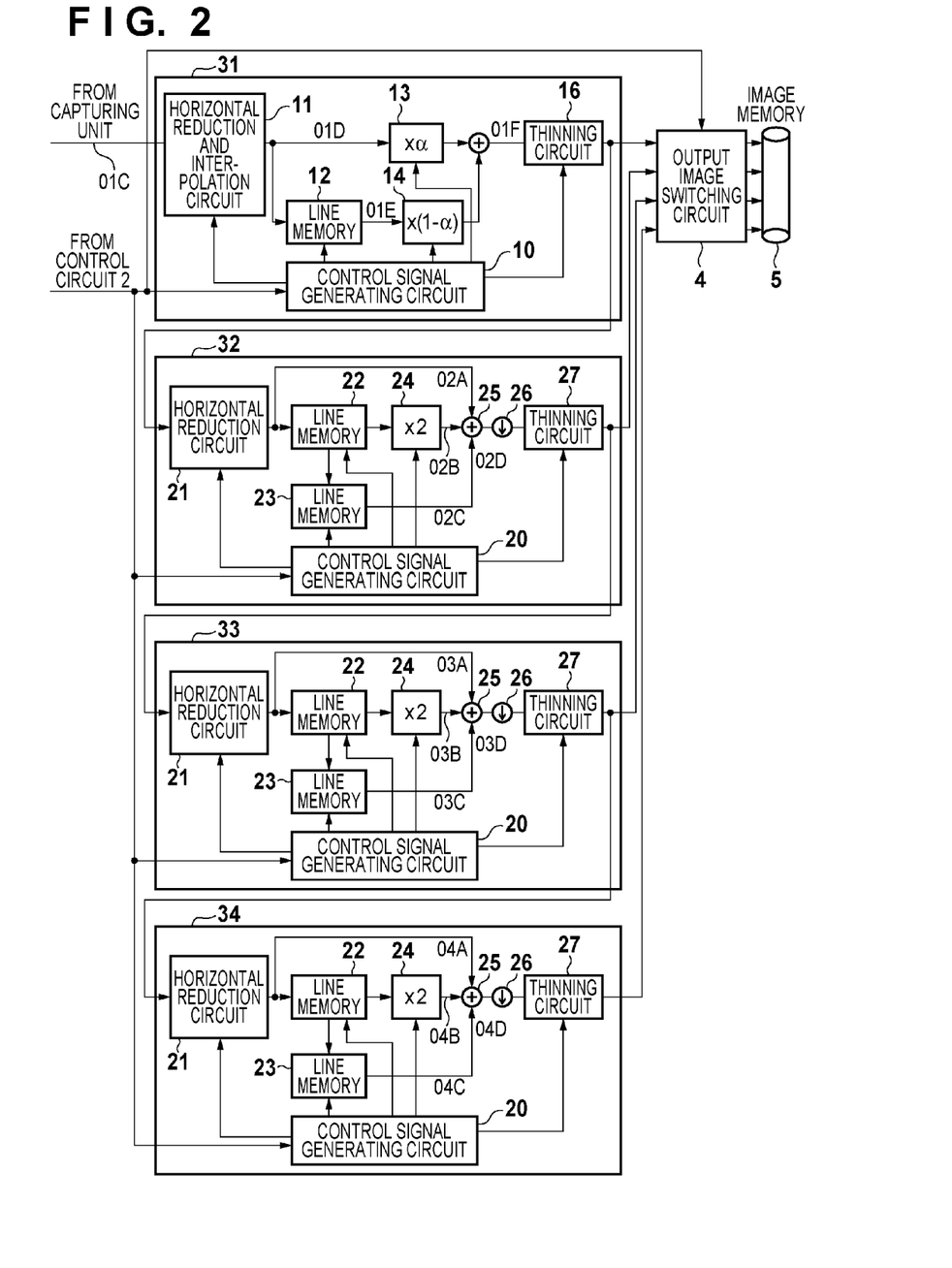
FIG. 2 is a block diagram showing examples of configurations of reduction circuits shown in FIG. 1.

FIG. 2 is a diagram showing examples of configurations of the reduction and interpolation circuit 31, the reduction circuit 32, the reduction circuit 33 and the reduction circuit 34.

In the reduction and interpolation circuit 31, a control signal generating circuit 10 determines a reduction ratio for use in reduction processing performed by the reduction and interpolation circuit 31 from the reduction ratio included in a control signal from the control circuit 2. Then, the control signal generating circuit 10 causes a horizontal reduction and interpolation circuit 11 to apply a low-pass filter having band limitation characteristics corresponding to the determined reduction ratio to an original image 01C so as to band-limit the original image 01C.

Specifically, the control signal generating circuit 10 changes the frequency band limitation characteristics of the linear filter (not shown) of the horizontal reduction and interpolation circuit 11 according to the reduction ratio. The linear filter may be, for example, a horizontal filter. The horizontal reduction and interpolation circuit 11 thins out the pixels of the band-limited original image 01C in the horizontal direction using the reduction ratio determined by the control signal generating circuit 10. The horizontally reduced image 01D that has been reduced in the horizontal direction is supplied to a line memory 12 and a multiplier 13. By thinning out the pixels of an image before storing the image in the line memory 12 in the manner described above, the capacity of the line memory 12 can be reduced.

The control signal generating circuit 10 determines the reduction ratio for use in reduction processing of the reduction and interpolation circuit 31 according to the reduction ratio from the control circuit 2. If the set reduction ratio (target reduction ratio) from the control circuit 2 falls within a range of the variable reduction ratio that can be used in the reduction and interpolation circuit 31, the control signal generating circuit 10 determines the target reduction ratio as the reduction ratio for use in reduction processing of the reduction and interpolation circuit 31. If, on the other hand, the target reduction ratio is higher than the highest value of the variable reduction ratio that can be used in the reduction and interpolation circuit 31, the control signal generating circuit 10 determines the reduction ratio for use in reduction processing of the reduction and interpolation circuit 31 in the following manner. The control signal generating circuit 10 determines the reduction ratio used in the reduction and interpolation circuit 31 such that the target reduction ratio can be achieved through a combination of the reduction ratio used in the reduction and interpolation circuit 31 and one or more of the fixed reduction ratios of the reduction circuits 32 to 34. In order to reduce the circuitry size of the reduction and interpolation circuit 31, in particular, in order to reduce the circuitry size of the linear filter and the capacity of the line memory 12, it is desirable that the reduction ratio corresponding to the frequency band limitation characteristics of the linear filter is ×1.0 (1/1) to ×0.5 (1/2).

The control signal generating circuit 10 also controls the writing timing and the reading timing of the horizontally reduced image 01D to and from the line memory 12 in accordance with the control signal from the control circuit 2.

The control signal generating circuit 10 also calculates, for each pixel, an interpolation coefficient α for bilinear interpolation corresponding to the reduction ratio for use in reduction processing performed by the reduction and interpolation circuit 31, and supplies the interpolation coefficient α to the multiplier 13 and a coefficient of (1−α) to a multiplier 14.

The line memory 12 stores the horizontally reduced image 01D and supplies the image to the multiplier 14 with a delay of one temporal horizontal scan period under the control of the control signal generating circuit 10.

The multiplier 13 multiplies each pixel of the input horizontally reduced image 01D by the interpolation coefficient α, and outputs the product to an adder 15.

The multiplier 14 multiplies each pixel of the image (hereinafter referred to as the "first delayed image 01E") input from the line memory 12 by the coefficient (1−α), and outputs the product to the adder 15.

The adder 15 adds up the products input from the multipliers 13 and 14, and outputs, to a thinning circuit 16, an addition image (hereinafter referred to as the "addition image 01F") represented by the following expression:

$$D \times \alpha + E \times (1-\alpha),$$

where D is a pixel value of the horizontally reduced image 01D, and E is a pixel value of the delayed image 01E.

The control signal generating circuit 10 thins out, using the thinning circuit 16, the pixels in the vertical direction of the addition image 01F according to the reduction ratio for use in the reduction and interpolation circuit 31 so as to generate a first reduced image, and outputs the first reduced image to the output image switching circuit 4 and the reduction circuit 32 as a first stage image.

In order to further reduce the circuitry size, the multipliers 13 and 14 and the adder 15 that are used to calculate the addition image 01F are actually constituted by a circuit that calculates $(D-E) \times \alpha + E$ that is equivalent to the above expression.

In the reduction circuit 32, a control signal generating circuit 20 first performs band limitation by causing a horizontal reduction circuit 21 to apply a [1 2 1]/4 horizontal filter to each pixel of the input first stage image, and thereafter the pixels in the horizontal direction are thinned out by 1/2. The thus-generated horizontally reduced image (hereinafter referred to as the "horizontally reduced image 02A") is written into line memories 22 and 23 under the control of the control signal generating circuit 20.

The line memory 22 stores the horizontally reduced image 02A and supplies the image to the line memory 23 and a multiplier 24 with a delay of one horizontal scan period under the control of the control signal generating circuit 20.

The line memory 23 stores the image supplied from the line memory 22, further delays the image by one horizontal scan period, and outputs the horizontally reduced image 02A delayed by two horizontal scan periods in total to an adder 25 as an image 02C, under the control of the control signal generating circuit 20.

The multiplier 24 multiplies the image supplied from the line memory 22 by 2, and outputs the resultant image to the adder 25 as an image 02B.

The adder 25 adds up the respective pixels of the images 02A, 02B and 02C.

A bit shift circuit 26 right-shifts each pixel value of the result of addition of 02A+02B+02C by 2 bits, removes high frequency components, and outputs the resultant image to a thinning circuit 27 as an image 02D.

The thinning circuit 27 thins out the pixels in the vertical direction of the image 02D to 1/2 so as to generate a second reduced image, and outputs the second reduced image to the output image switching circuit 4 and the reduction circuit 33 as a second stage image, under the control of the control signal generating circuit 20.

The reduction circuits 33 and 34 have the same circuit configuration as that of the reduction circuit 32, and thus apply the same processing as that performed by the reduction circuit 32 to the second stage image and the third stage image so as to generate a third stage image and a fourth stage image, respectively. The third stage image generated by the reduction circuit 33 is output to the reduction circuit 34 and the output image switching circuit 4. The fourth stage image generated by the reduction circuit 34 is output to the output image switching circuit 4.

Next, the output image switching circuit 4 selects stage images to be output to the image memory 5 for combining processing performed by the multirate signal processing circuit 6 from among the input first to fourth stage images according to the reduction ratio from the control circuit 2, and stores the selected stage images in the image memory 5.

The operations of the image processing apparatus of the present embodiment will be described in further detail, using an example in which an original image having 4096 horizontal pixels and 3072 vertical pixels is reduced to an image having 1536 horizontal pixels and 1152 vertical pixels, with reference to FIGS. 3 to 5D.

In this case, the reduction ratio is 3/8 (37.5%) in both horizontal and vertical directions. The reduction ratio ranges from 1/2 to 1/4 (4/8 to 2/8). The control circuit 2 provides the image reduction ratio to the reduction and interpolation circuit 31 and the reduction circuits 32 to 34.

Figure 3:
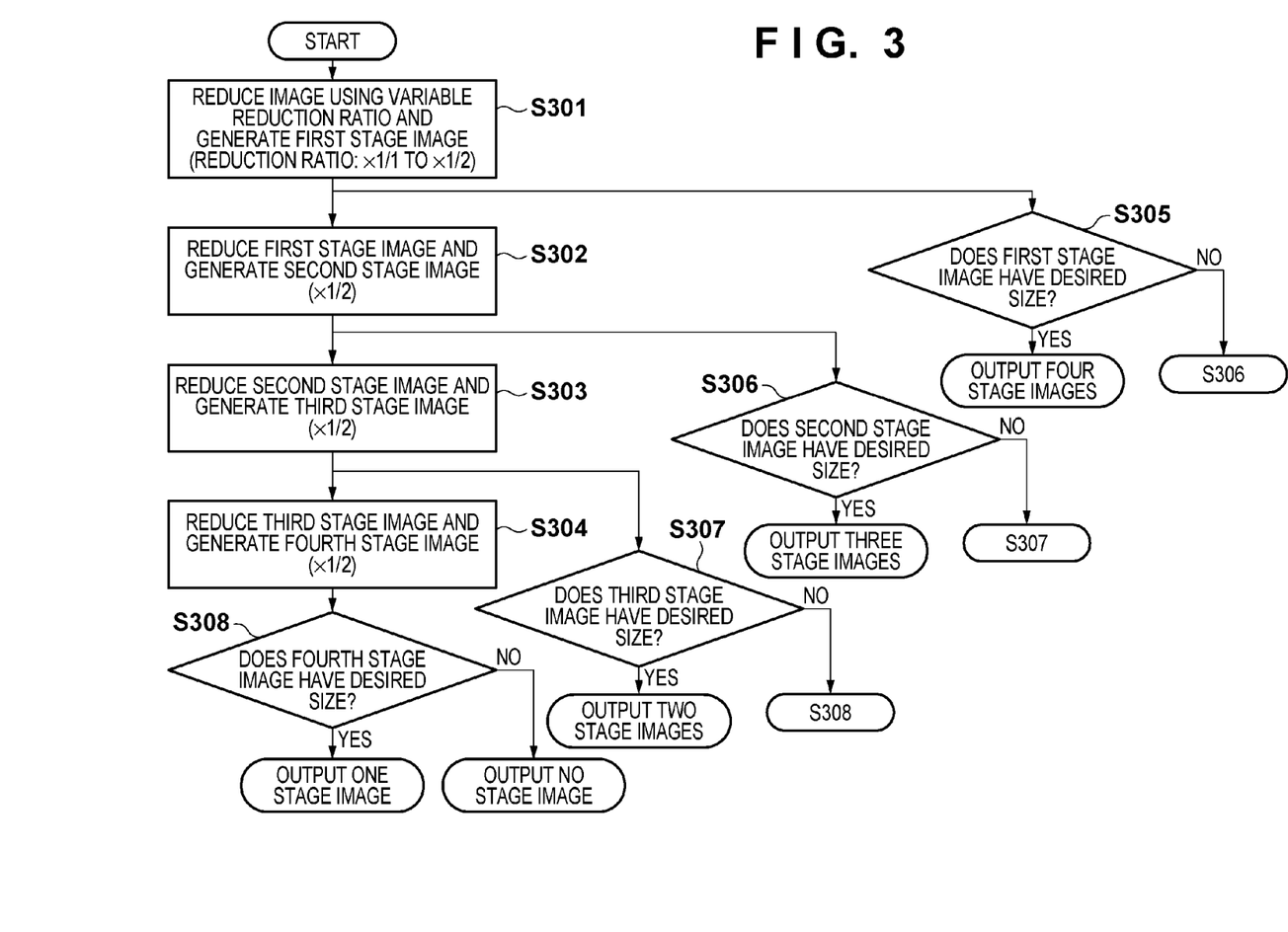
FIG. 3 is a flowchart illustrating operations of the image processing apparatus according to the embodiment of the present invention.

In S301, the control signal generating circuit 10 of the reduction and interpolation circuit 31 determines, in consideration of the fact that the circuits in the subsequent stages, namely, the reduction circuits 32 to 34 are 1/2 reduction circuits, the reduction ratio for use in reduction processing performed by the reduction and interpolation circuit 31 to be 6/8. Then, the control signal generating circuit 10 sets the frequency band limitation characteristics of the linear filter of the horizontal reduction and interpolation circuit 11 to characteristics corresponding to a reduction ratio of 6/8. and sets 6/8 in the horizontal thinning circuit as the reduction ratio. The horizontal reduction and interpolation circuit 11 applies a linear filter corresponding to the reduction ratio (6/8) to the original image according to this setting so as to perform band limitation, and thereafter thins out the pixels in the horizontal direction to 6/8. Then, the control signal generating circuit 10 sets the vertical reduction ratio to 6/8 in the thinning circuit 16. The thinning circuit 16 thins out the pixels in the vertical direction of the addition image 01F output from the adder 15 to 6/8 according to this setting, and generates a first stage image 401 (FIG. 4) (S301).

The thinning operations of the linear filter corresponding to a reduction ratio of 6/8 and the thinning circuit 16 in the reduction and interpolation circuit 31 will be described now with reference to FIGS. 5A to 5D.

In the case where the reduction ratio is 6/8. the reduction and interpolation circuit 31 removes the (4×N+2)th pixel (where N is an integer of 0 or greater). With respect to the (4×N+1)th pixel, its pixel values is used, and with respect to the (4×N+3)th pixel and the (4×N+4)th pixel, an average value thereof with the right neighboring pixel is output.

Specifically, if the pixels of the input image are represented by A, B, C, D, E, F, G, H, I, and so on, because the pixel A is the (4×N+1)th pixel, the value A' after filter processing will be A'=A×1.0+B×0.0.

The pixel B is the (4×N+2)th pixel. This pixel will be removed by the thinning circuit 16 in the end, but the value B' after filter processing will be B'=B×0.75+C×0.25.

The pixel C is the (4×N+3)th pixel, and therefore the value C' after filter processing will be C'=C×0.5+D×0.5.

The pixel D is the (4×N+4)th pixel, and therefore the value D' after filter processing will be D'=D×0.25+E×0.75.

Similarly, with respect to the pixel E, E'=E×1.0+F×0.0 will be obtained. With respect to the pixel F, F'=F×0.75+G×0.25 will be obtained. With respect to the pixel G, G' =G x 0.5 + H×0.5 will be obtained, and with respect to the pixel H, H'=H×0.25+I×0.75 will be obtained. With respect to the pixels subsequent to the pixel H, the horizontal reduction and interpolation circuit 11 applies the same filter processing on each pixel.

Figure 5A:
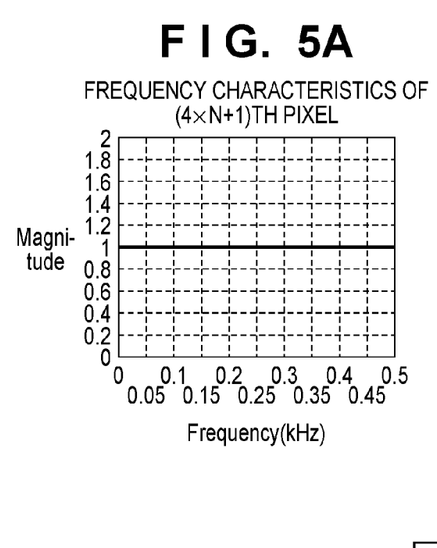
FIGS. 5A to 5D are diagrams illustrating band-limiting filter characteristics and an example of pixel thinning in the image processing apparatus of the embodiment of the present invention.
Figure 5B:
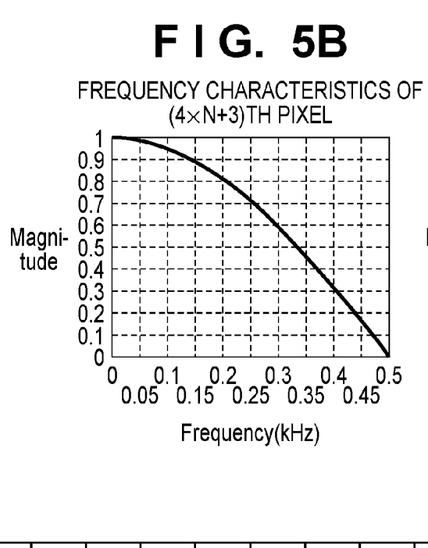
Figure 5C:
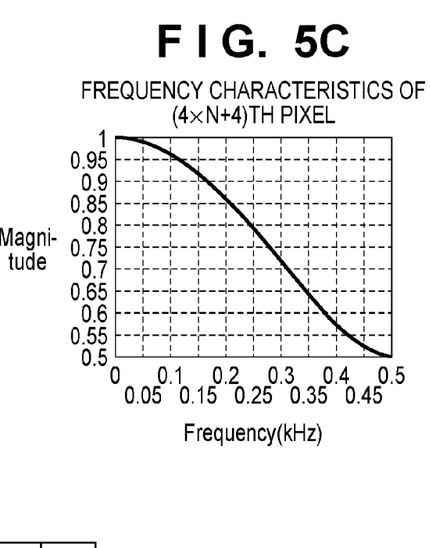

Through this filter processing, frequency characteristics of the (4×N+1)th pixel, the (4×N+3)th pixel and the (4×N+4)th pixel as shown in FIGS. 5A to 5C can be obtained.

Figure 4:
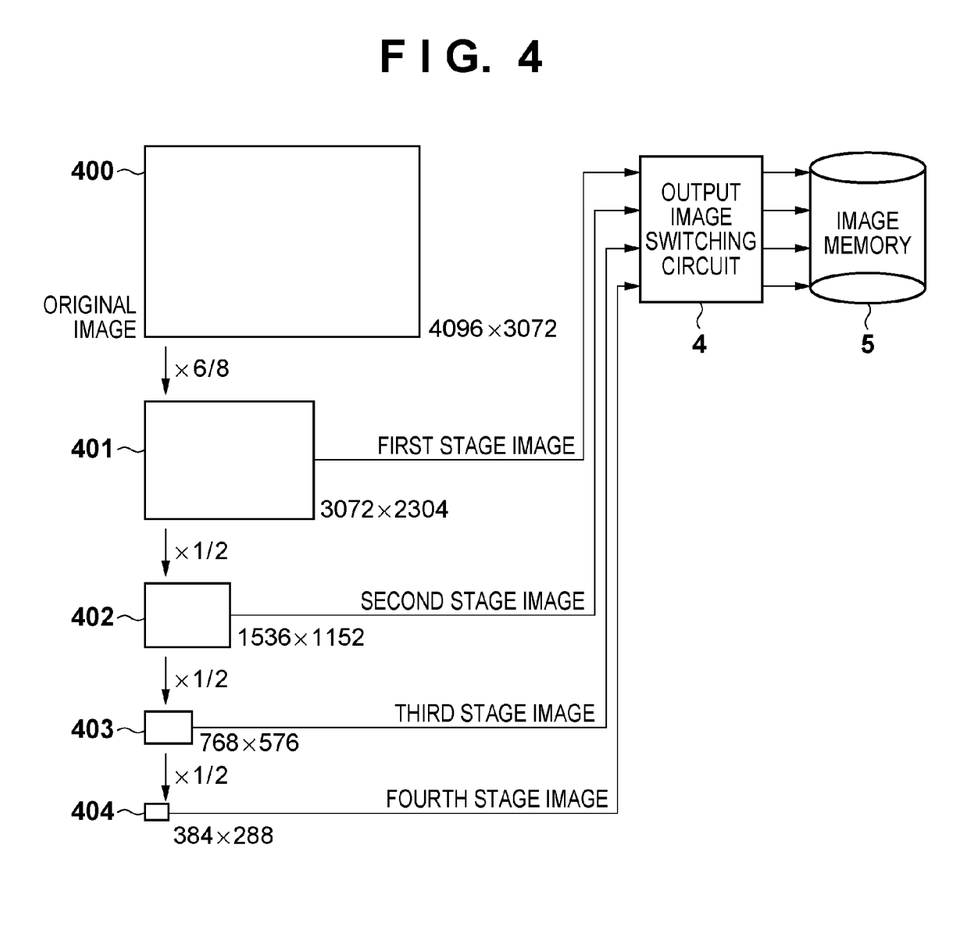
FIG. 4 is a diagram showing examples of multistage images generated by the image processing apparatus of the embodiment of the present invention.
Figure 5D:
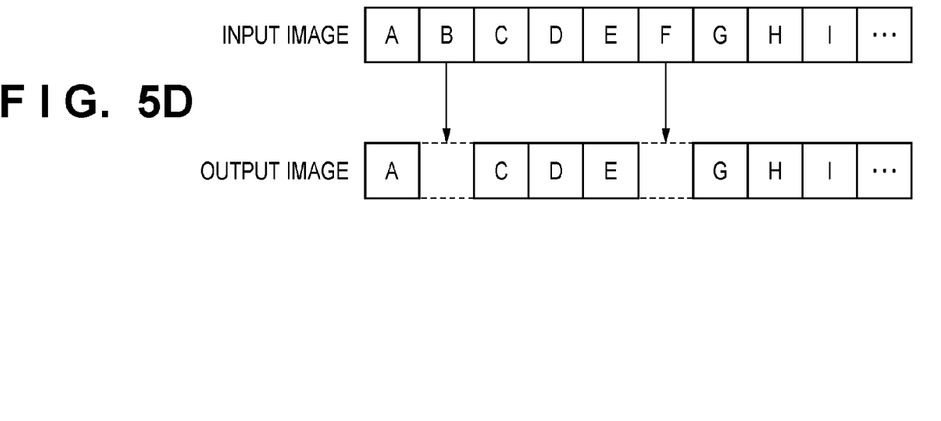

The thinning circuit of the horizontal reduction and interpolation circuit 11 removes the (4N+2)th pixel as shown in FIG. 5D so as to generate a horizontally reduced image 01D having 3072 horizontal pixels. Likewise, the thinning circuit 16 performs thinning in the vertical direction on the addition image 01F output from the adder 15, and thereby a first stage image 401 (FIG. 4) having 3072 horizontal pixels and 2304 vertical pixels is generated. The first stage image 401 is provided to the reduction circuit 32 and the output image switching circuit 4.

In S305, the output image switching circuit 4 determines whether the first stage image 401 has the desired size corresponding to the reduction ratio from the control circuit 2. In this case, since the first stage image 401 does not have the desired size, the output image switching circuit 4 advances the procedure to the determination process of S306.

The reduction circuit 32 applies the above-described processing on the input first stage image and generates a second stage image 402 (FIG. 4) whose number of pixels has been reduced to 1/2 in the vertical and horizontal directions, or in other words, that has 1536 horizontal pixels and 1152 vertical pixels. The reduction circuit 32 outputs the second stage image 402 to the reduction circuit 33 and the output image switching circuit 4 (S302).

In S306, the output image switching circuit 4 determines whether the second stage image 402 has the desired size. The output image switching circuit 4 thereby determines the number of stage images output to the image memory 5 to 3. In other words, the output image switching circuit 4 determines the stage image having the desired size and all stage images having a size smaller than the desired size as images to be output to the image memory 5.

Specifically, in the case where a reduced image generation unit (the reduction and interpolation circuit 31 and the reduction circuits 32 to 34) is configured as shown in FIG. 1, if the target reduction ratio is 1/1 to 1/2. the output image switching circuit 4 stores all of the first stage image 401 to the fourth stage image 404 in the image memory 5.

If the reduction ratio is less than 1/2 to 1/4. the output image switching circuit 4 stores the second stage image 402 to the fourth stage image 404 in the image memory 5.

If the reduction ratio is less than 1/4 to 1/8. the output image switching circuit 4 stores the third stage image 403 and the fourth stage image 404 in the image memory 5.

If the reduction ratio is less than 1/8 to 1/16. the output image switching circuit 4 outputs the fourth stage image 404 to the image memory 5.

One skilled in the art will understand that if it is necessary to cope with an even higher reduction ratio, the fixed reduction ratio of the reduction circuits 32 to 34 or the number of reduction circuits connected can be increased.

The reduction circuit 33 applies the above-described processing to the input second stage image, and generates a third stage image 403 (FIG. 4) whose number of pixels has been reduced to 1/2 in the vertical and horizontal directions, or in other words, that has 768 horizontal pixels and 576 vertical pixels. The reduction circuit 33 outputs the third stage image 403 to the reduction circuit 34 and the output image switching circuit 4 (S303).

Since the number of stage images output to the image memory 5 has already been determined in S306, the output image switching circuit 4 does not perform the determination process of S307.

The reduction circuit 34 applies the above-described processing to the input third stage image, and generates a fourth stage image 404 whose number of pixels has been reduced to 1/2 in the vertical and horizontal directions, or in other words, that has 384 horizontal pixels and 288 vertical pixels. The reduction circuit 34 outputs the fourth stage image 404 (FIG. 4) to the output image switching circuit 4 (S304).

Since the number of stage images output to the image memory 5 has already been determined in S306, the output image switching circuit 4 does not perform the determination process of S308.

As described above, the present embodiment has a configuration in which the reduction and interpolation circuit 31 having a variable reduction ratio corresponding to a relatively small reduction ratio and the reduction circuits 32 to 34 having a fixed reduction ratio are sequentially-connected. The following advantages can be obtained by setting the maximum reduction ratio supported by a first reduction circuit (the reduction and interpolation circuit 31) to a low value (×0.5 at maximum), rather than by generating an image having the desired reduction ratio with a single instance of reduction processing:

the need to increase the number of taps of a band-limiting filter required in the first reduction circuit can be eliminated, reducing the size of the filter circuit, and in the first reduction circuit that processes the largest number of pixels, the line memory 12 is required to have only a capacity corresponding to a single line.

Also, the configuration in which a reduction circuit having a variable reduction ratio and at least one reduction circuit having a fixed reduction ratio are sequentially-connected is advantageous in that it is possible to cope with a wide range of reduction ratios, as well as obtaining a plurality of stage images having different number of instances of filter processing, and generating a reduced image having high image quality by multirate signal processing.

In the second and subsequent reduction circuits, in particular, the third and subsequent reduction circuit (the reduction circuit 33 and subsequent reduction circuits), the capacity of the line memories can be reduced significantly.

Furthermore, the output image switching circuit 4 stores not only a reduced image of the desired size, but also a stage image having a size smaller than the desired size (but having a high SN ratio) in the image memory 5, and therefore the present embodiment is advantageous for generating a reduced image having high image quality by multirate signal processing.

Furthermore, in the configuration of the present embodiment, a plurality of reduction circuits are sequentially connected, and therefore the required amount of reading and writing to and from an image memory (memory bandwidth) can be reduced significantly compared to the configuration that repeatedly uses a single reduction circuit.

For example, in the case where the above-described example is implemented by using one reduction circuit a plurality of times, the following operations will be required:
writing of the first stage image (3072 horizontal pixels and 2304 vertical pixels);
reading of the first stage image (3072 horizontal pixels and 2304 vertical pixels);
writing of the second stage image (1536 horizontal pixels and 1152 vertical pixels);
reading of the second stage image (1536 horizontal pixels and 1152 vertical pixels);
writing of the third stage image (768 horizontal pixels and 576 vertical pixels);
reading of the third stage image (768 horizontal pixels and 576 vertical pixels);
writing of the fourth stage image (384 horizontal pixels and 288 vertical pixels); and
reading of the fourth stage image (384 horizontal pixels and 288 vertical pixels). This requires an amount of memory access (memory bandwidth) corresponding to approximately 18.8 M pixels.

In contrast, the configuration of the present embodiment only requires the following operations:
writing of the second stage image (1536 horizontal pixels and 1152 vertical pixels);
writing of the third stage image (768 horizontal pixels and 576 vertical pixels); and
writing of the fourth stage image (384 horizontal pixels and 288 vertical pixels). Therefore, an amount of memory access corresponding to approximately 2.3 M pixels, or in other words, 1/8 of the memory bandwidth is sufficient. This memory bandwidth reduction effect becomes more pronounced as the reduction ratio increases.

As described above, according to the present embodiment, a reduced image is generated using a configuration in which a reduction circuit having a variable reduction ratio and at least one reduction circuit having a fixed reduction ratio are sequentially connected. With this configuration, it is possible to obtain the following advantages. The size of the band-limiting filter can be reduced compared to the configuration in which a reduced image is generated with a single instance of reduction processing. Also, the memory bandwidth can be reduced significantly compared to the configuration in which a plurality of instances of reduction processing are executed by repeatedly using a single reduction circuit. Also, stage images suitable for multirate signal processing can be obtained with ease.

The embodiment given above has been described in the context of generating reduced images by multirate signal processing to which the present invention can be applied. However, generation of reduced images by multirate signal processing is not necessarily required in the present invention, and it is also possible to use a configuration in which only a reduced image of the desired size is output.

OTHER EMBODIMENTS

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-222431. filed on Sep. 30, 2010. which is hereby incorporated by reference herein its entirety.

What is claimed is:

1. An image processing apparatus that reduces an original image and generates a reduced image having a set reduction ratio, the apparatus comprising:
a first reduction unit adapted to apply reduction processing to the original image using a variable reduction ratio and outputs a first reduced image;
a second reduction unit adapted to apply reduction processing using a fixed reduction ratio to the first reduced image and output a second reduced image;
at least one third reduction unit, which is connected to a subsequent stage of the second reduction unit, adapted to apply, at least once, the reduction processing using the fixed reduction ratio to the second reduced image; and
a selection unit adapted to select the reduced image having the set reduction ratio and a reduced image having higher reduction ratio than the set reduction ratio output from a reduction unit, among the second reduction unit and the at least one third reduction unit, that is connected to any subsequent stages of the reduction unit that outputs the reduced image having the set reduction ratio, and store the selected reduced images in a storage device,
wherein in a case where the set reduction ratio is higher than a highest value of the variable reduction ratio, the first reduction unit sets the variable reduction ratio such that the set reduction ratio can be achieved through a combination of the reduction processing by the first reduction unit and at least one instance of the reduction processing using the fixed reduction ratio, and one of the second reduction unit and the at least one third reduction unit outputs a reduced image having the set reduction ratio.

2. The image processing apparatus according to claim 1, wherein in a case where the set reduction ratio falls within a range of the variable reduction ratio, the selection unit selects the first reduced image and a reduced image output from each of the second reduction unit and the at least one third reduction unit, and store the selected reduced images in the storage device.

3. The image processing apparatus according to claim 1, further comprising a combining unit adapted to combine the reduced images that are stored in the storage device by the selection unit, and generate a reduced image having the set reduction ratio.

4. The image processing apparatus according to claim 1, wherein the variable reduction ratio ranges from 1/1 to 1/2.

5. A control method of an image processing apparatus that reduces an original image and generates a reduced image having a set reduction ratio, the method comprising:
   a first reduction step performed by a circuit applying reduction processing using a variable reduction ratio to the original image and outputs a first reduced image; and
   a second reduction step performed by a circuit applying reduction processing using a fixed reduction ratio to the first reduced image and outputting a second reduced image,
   a third reduction step performed by a circuit applying at least once, the reduction processing using the fixed reduction ratio to the second reduced image; and
   a selection step performed by a circuit selecting the reduced image having the set reduction ratio and a reduced image having higher reduction ratio than the set reduction ratio output from a reduction step, among the second reduction step and the third reduction step, that is applied after the reduced image having the set reduction ratio is output, and storing the selected reduced images in a storage device,
   wherein in a case where the set reduction ratio is higher than a highest value of the variable reduction ratio, the first reduction step sets the variable reduction ratio such that the set reduction ratio can be achieved through a combination of the reduction processing applied in the first reduction step and at least one instance of the reduction processing using the fixed reduction ratio, and one of the second reduction step and the at least one third reduction step outputs a reduced image having the set reduction ratio.

6. A non-transitory computer-readable recording medium storing a program for causing a computer to execute each step of the control method of an image processing apparatus according to claim 5.

* * * * *